United States Patent [19]
Ellis, Sr.

[11] Patent Number: 4,601,509
[45] Date of Patent: Jul. 22, 1986

[54] MOBILE KITCHEN AND CAFETERIA UNIT

[76] Inventor: William L. Ellis, Sr., P.O. Box 3509, Wilson, N.C. 27893

[21] Appl. No.: 697,268

[22] Filed: Feb. 1, 1985

[51] Int. Cl.$^4$ .............................................. B60P 3/02
[52] U.S. Cl. .................................. 296/22; 296/24 R; 296/24 A
[58] Field of Search .................... 296/22, 24 A, 24 R; 105/327; 126/276; 98/36, 2.14, 2.5

[56] References Cited

U.S. PATENT DOCUMENTS

| | | | |
|---|---|---|---|
| 458,738 | 9/1891 | Palmer | 296/22 |
| 2,706,132 | 4/1955 | Chaffin | 296/163 |
| 3,255,686 | 6/1966 | Larson et al. | 98/36 |
| 4,270,319 | 6/1981 | Spasojevic | 296/22 |

FOREIGN PATENT DOCUMENTS

| | | | |
|---|---|---|---|
| 319108 | 3/1957 | Switzerland | 296/22 |
| 605206 | 9/1978 | Switzerland | 296/22 |

*Primary Examiner*—Robert R. Song
*Attorney, Agent, or Firm*—Bell, Seltzer, Park & Gibson

[57] ABSTRACT

A combination mobile kitchen and cafeteria unit is provided which comprises an elongate wheeled walled enclosure having ingress and egress patron passageways along a side wall thereof with a patron serving aisle within the enclosure communicating with the ingress and egress passageways and along which aisle extend facilities for serving food and beverage. Also provided are attendant facilities for food and beverage storage and preparation, cooking, food cooling and washing.

9 Claims, 7 Drawing Figures

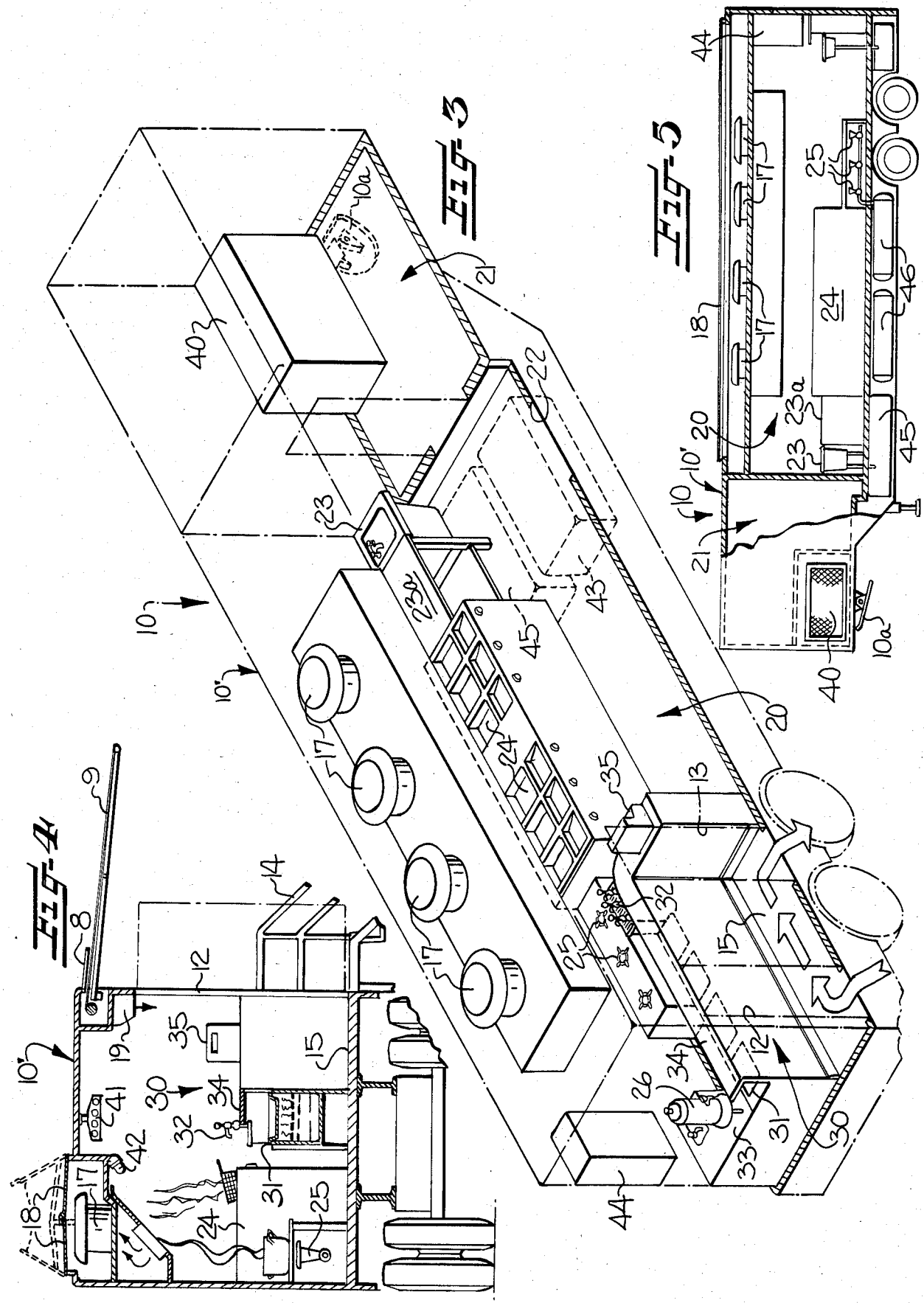

MOBILE KITCHEN AND CAFETERIA UNIT

FIELD OF THE INVENTION

This invention relates to the field of mobile food services and more particularly to a mobile kitchen and cafeteria unit which may be readily moved considerable distances wherein the preparation and serving of meals to a large number of patrons at a distal location may be accomplished.

BACKGROUND OF THE INVENTION

Attempting to serve meals to a large number of persons at distant locations has been a longstanding problem. Quite frequently, persons charged with the duty of selecting an outdoor site for a picnic or other social function at which meals will be served is limited in the choice of potential sites as the result of several factors. For example, the number of attendees at the function may be so large as to necessitate a site having permanent cooking and/or serving facilities and in many cases even when the locations have permanent facilities, they may be deficient in one form or another. As an example, the available facilities may be unevenly matched to the number of attendees or will be unsuitable for the preparation of the proposed menu. In addition, many sites have inadequate sanitary facilities for the preparation and washing of the food to be served. Thus, many planners of such functions are forced to compromise their choice of menu, party size or location.

It has been previously proposed that one way to avoid the mentioned problems is to provide a mobile kitchen. The cooking and serving facilities are transported in a truck or van to the preselected site, are removed therefrom and are set up for a one time use. Upon completion of the event the facilities are "broken down" and are again loaded onto the truck.

Another system which proposes to deal with the aforementioned problems is the so called "catering van" which typically carries pre-cooked food or which may contain minimal cooking facilities from which the food is usually removed. The "catering van" is not without its inherent drawbacks. For example, only a relatively small number of persons may be served as such units are typically small and therefore have limited capabilities. In some units of this type patrons are served through a large window in the side wall of the truck.

With the foregoing in mind, it is an object of the present invention to provide a kitchen and cafeteria unit within a mobile enclosure wherein the food to be cooked is stored on board along with the cooking and food serving facilities.

Another object is to provide a mobile kitchen and cafeteria unit so arranged that the patrons may be served the food on board the unit without interference with preparation and cooking of the food.

SUMMARY OF THE INVENTION

The foregoing objects of the present invention are accomplished by a combination mobile kitchen and cafeteria unit that is constructed within the walled enclosure of a truck tractor type trailer. Ingress and egress means are provided in the walled enclosure and a patron serving aisle communicates with the ingress and egress means with food and beverage serving means extending along the patron serving aisle. Food and beverage storage and preparation means are also provided within the unit and include food cooking means, and cooling means for the food to be prepared and the beverages offered the patrons.

BRIEF DESCRIPTION OF THE DRAWINGS

FIG. 3 is a perspective view of the mobile kitchen and cafeteria unit, broken away to illustrate the interior thereof.

FIG. 4 is a rear elevational view, broken away, showing the mobile kitchen and cafeteria unit.

FIG. 5 is a side elevational view of the mobile kitchen and cafeteria unit showing the ventilation and power systems.

DETAILED DESCRIPTION OF THE ILLUSTRATED EMBODIMENT

Figure 1:
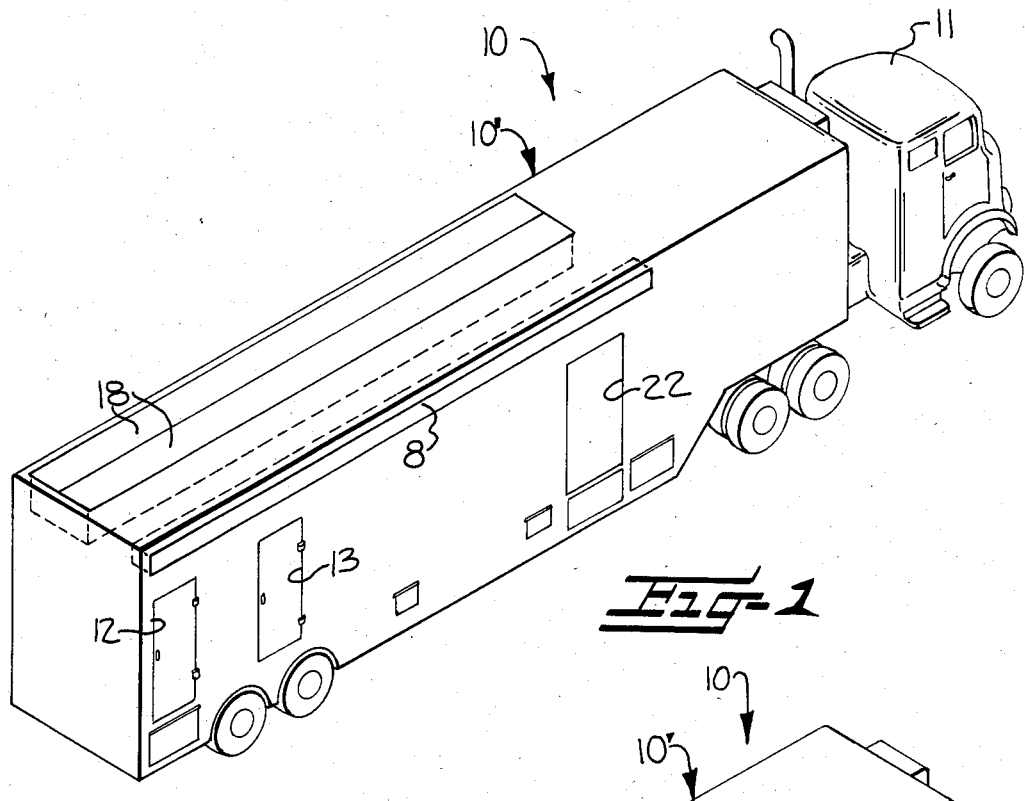
FIG. 1 is a prespective view of the mobile kitchen and cafeteria unit in its transport mode.

While the present invention will be described more fully hereinafter with reference to the accompanying drawings, in which a particular embodiment is shown, it is to be understood at the outset that persons of skill in the art may modify the invention herein described while still achieving the favorable results of this invention. Accordingly, the description which follows is to be understood as being a broad teaching disclosure directed to persons of skill in the appropriate arts, and not as limiting upon the present invention.

The instant invention provides a mobile kitchen and cafeteria unit 10 which may be readily moved considerable distances for the serving of meals to a large number of patrons at a desired distal location. The unit is desirably incorporated in a suitably modified enclosed tractor trailer, commonly known as a semi trailer 10' and is designed to be pulled to distal locations with the aid of a truck tractor 11 merely by connection of the tractor 11 to a hitch 10a on the front end of the trailer 10'. This hitch enables the tractor to be removed and used for other purposes if desired while the unit 10 is not in use. Since the unit is designed for distant travel to interstate locations the unit is contructed so that no portion of the unit extends beyond any of the outer walls of a conventional truck tractor trailer.

The trailer 10' comprises a wheeled walled enclosure having an ingress patron passageway 12 and an egress patron pasageway 13 along a common side wall of the trailer. In addition, to facilitate ease of entry of the patrons, removable stairs 14 are provided for each of the aforementioned patron passageways. Once the mobile unit has been positioned for serving at an event, then the stairs 14 may be removed from their normal storage location inside the unit and positioned as illustrated adjacent the patron ingress and egress means 12, 13.

In addition a retractable awning 9, preferably power controlled, may be extended so as to overlie the patron ingress and egress means. The awning 9 is stored in a recessed overhead enclosure covered by a movable flap 8 along the side of the unit above the ingress and egress means. When it is desired that the awning be extended, the power control system (not shown) is activated causing the flap 8 to move from a position flush with the side wall of the unit to a position roughly perpendicular thereto, then the awning is extended by means of a conventional electric drive motor and pulley system (not shown).

Figure 2:
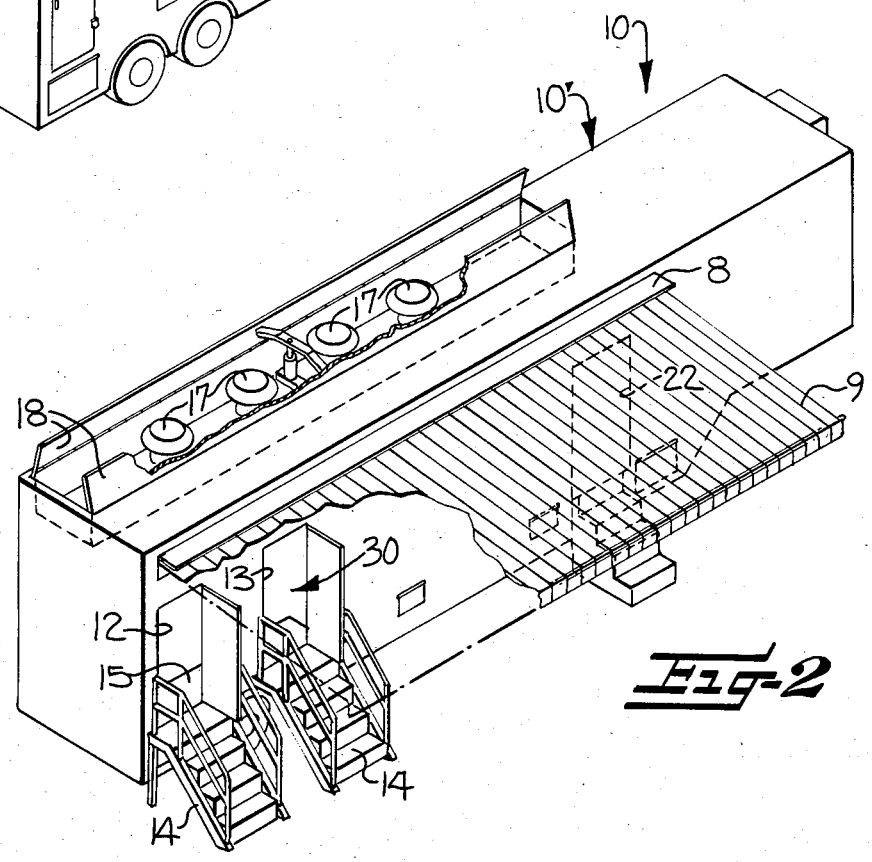
FIG. 2 is a perspective view of the mobile kitchen and cafeteria unit in its cooking and serving mode.
Figure 6:
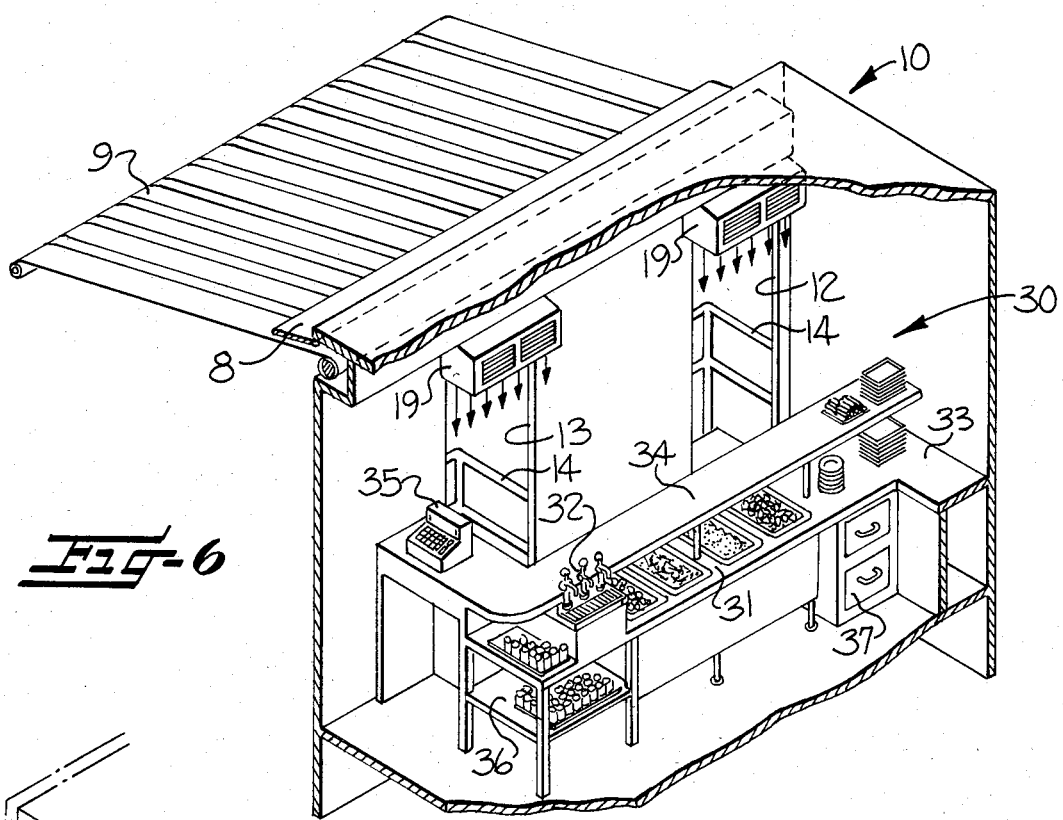
FIG. 6 is a perspective view from the inside of the mobile kitchen and cafeteria unit looking out of the food serving area and patron serving aisle.
Figure 7:
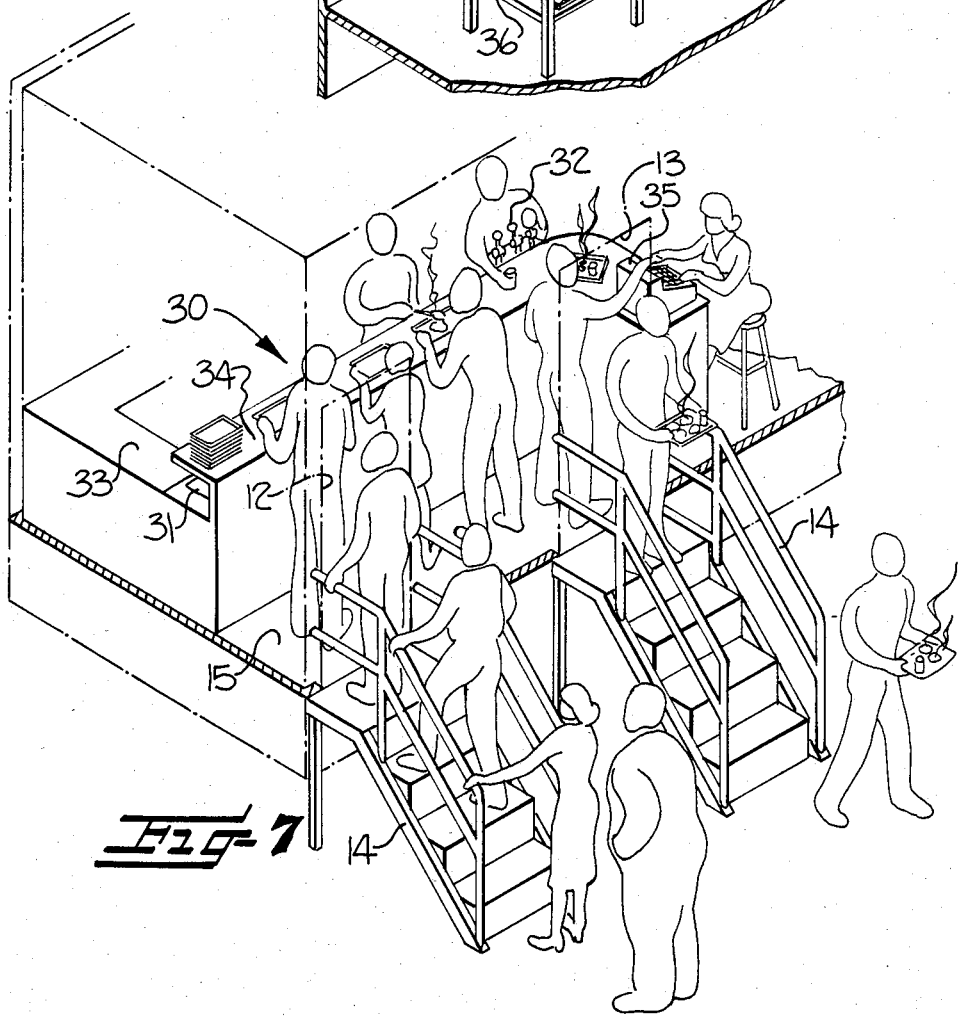
FIG. 7 is a perspective view partially broken away, of the food and beverage serving means extending alongside the patron serving aisle.

A flap arrangement similar to the abovementioned flaps for the awning is also provided for ventilating or air circulating means 17 shown in the form of a bank of exhaust fans, FIG. 2. A pair of flaps 18, (controlled by conventional powered pneumatics, not shown) are provided that are movable from a position flush with the roof of the unit to a nearly vertical position thus exposing the air circulating means 17 to the atmosphere, for drawing fresh air into the unit and removing foul air and fumes from the unit during the operation of the same.

In addition, means for inhibiting flies and insects from entering the enclosure are provided in the form of fans 19 positioned above the ingress and egress means 12, 13. The fans 19 are positioned to direct a vertical column of air downwardly across the ingress and egress passageways to thus provide a turbulent air screen in the passageways.

The interior of the mobile kitchen and cafeteria unit is designed for ease of patron flow through the unit, ease of serving and ease of food preparation and storage. In accordance with the aforementioned design objectives, the unit is divided into means defining a patron serving aisle, food and beverage serving means and means defining food and beverage storage and preparation means.

The means defining the food and beverage storage and preparation means within the wheeled walled enclosure occupy approximately the front two-thirds of the trailer 10', indicated generally at 20. In general, the food and beverage storage and preparation means is designed for sensible work flow therein and extends alongside a sidewall opposite from the common sidewall along which the ingress and egress passageways are positioned. Specifically, at the forward end of the trailer is the cooling or refrigeration means 21 which is positioned in a proximate relation to a loading door 22. This enables the foodstuffs, as well as other items such as condiments and paper goods for serving to be easily loaded on board the unit. Positioned in operative relation to the cooling means 21 is a faucet equipped sink means 23 and an adjacent work surface 23a. Thus, as foodstuffs are removed from the freezer they may be placed on the work surface 23a for ease of handling prior to washing in the sink 23, if required. From there the various foodstuffs to be prepared such as chicken, Bar-b-que, vegetables, or french fries may be cooked in the deep fat fryers 24 or on the gas stoves 25, as appropriate. Also included is a coffee urn 26 for brewing and serving coffee. As illustrated, there is sufficient aisle space to enable the attendants to move about freely within the food and beverage storage and preparation area. Located near the end of the bank of gas stoves 25 and in the rear portion of the trailer 10' is food and beverage serving means 30 arranged to extend along the side of a patron serving aisle 15 positioned between and communicating with said ingress and egress passageways 12, 13, repectively. The food and beverage serving means 30 includes a steam table 31 for containing warm foodstuffs to be served and beverage dispensing means 32 in the form of a conventional soda fountain. In addition, the food and beverage serving means includes various support surfaces 33 for locating condiments, trays, and plates, etc. A counter or shelf 34 for patrons to slide their trays along while making their food selections is also provided. This shelf extends along the entire length of the patron serving aisle 15 and at the end of the shelf there may be located a cash register 35 for collecting funds from patrons when the meals have not been prepaid or ticketed. In addition, extra storage areas in the form of a shelf 36 and drawers 37 are provided for use as appropriate.

The mobile kitchen and cafeteria unit of the instant invention also includes electrical power generation means 40 for supplying electricity to the various electrical appliances including flourescent and incandescent lights 41, 42, respectively located overheard on board the unit. In addition, a water storage tank 43, a water heater 44, and a waste water tank 45, are provided to supply both fresh hot and cold water and to collect sink wastewater generated as the result of the food preparation and serving process. Further, liquid gas is carried on board in tanks 46, to supply the thermal requirements of the gas stoves 25 for the foodstuffs cooked thereon.

Thus, patrons enter the mobile kitchen and cafeteria unit by climbing stairs 14 leading to ingress means 12 and pass through the vertical column of air for keeping insects out of the enclosure created by fans 19. Once within the enclosure, patrons after picking up a tray and eating utensils are directed along the patron serving aisle 15 where the tray may be slid along the shelf 34 whereby the patron, may comfortably and easily make his food selection which is served by attendants staffing the food and beverage serving means 30. Upon reaching the end of the patron serving aisle 15, and prior to exiting through egress means 13, the patron will ideally have selected an entire meal including an entree, vegetables, dessert and a soft drink or coffee and made payment to a cashier, if required.

Thus, it will be seen that the mobile kitchen and cafeteria unit as presented herein is completely self-contained and may be successfully used in any desirable location, subject only to geographic limitation of distance.

The foregoing embodiment is to be considered illustrative, rather than restrictive of the invention, and those modifications which come within the meaning and range of equivalence of the claims are to be included therein.

That which is claimed is:

1. A combination mobile kitchen and cafeteria unit which may be readily moved considerable distances for the serving of meals to a large number of patrons at a desired distal location, said mobile unit comprising:
   an elongate wheeled walled enclosure having ingress and egress patron passageways positioned along a common side wall of said enclosure with the passageways being spaced from each other along the common side wall for accommodating patrons entering and leaving the enclosure in the serving of food thereto,
   means defining a patron serving aisle within said enclosure for patrons to walk along, said aisle extending alongside of said common side wall and communicating with and extending between said ingress and egress passageways so that the traffic flow of patrons moving along the aisle is one-way and toward the egress passageway,
   food and beverage serving means positioned along the side of said patron serving aisle opposite the side of the aisle along which the common side wall extends and being readily accessible to patrons moving along said aisle for partaking of the served food and the beverages, means defining food and beverage storage and preparation means within said enclosure and extending alongside a side wall opposite from said common side wall along which said ingress and egress passageways are positioned and thus being so located as to be readily accessible to said food and beverage serving means for permitting attendants to prepare and supply food and beverages to said food and beverage serving means without interference with patrons moving along said aisle, said food and beverage storage and preparation means including;

cooking means for cooking food, cooling means for maintaining food to be prepared in a cooled condition, and sink means connected to a suitable source of water for the washing of the food attendants' hands and the washing of the food in the preparation for the cooking thereof, electrical lighting means positioned at predetermined locations within the wheeled walled enclosure for illuminating the interior of said wheeled walled enclosure; and air circulating means carried by said enclosure and arranged to deliver fresh air from outside the enclosure to within the enclosure and to exhaust foul air and fumes from the area of food preparation.

2. A combination mobile kitchen and cafeteria unit which may be readily moved considerable distances for the serving of meals to a large number of patrons at a desired distal location, said mobile unit comprising:

an elongate wheeled walled enclosure having ingress and egress patron passageways positioned along a common side wall of said enclosure with the passageways being spaced from each other along the common side wall for accommodating patrons entering and leaving the enclosure in the serving of food thereto, means defining a patron serving aisle within said enclosure for patrons to walk along, said aisle extending alongside of said common side wall and communicating with and extending between said ingress and egress passageways so that the traffic flow of patrons moving along the aisle is one-way and toward the egress passageway, food and beverage serving means positioned along the side of said patron serving aisle opposite the side of the aisle along which the common side wall extends and being readily accessible to patrons moving along said aisle for partaking of the served food and beverages, said food and beverage serving means including a steam table for containing warm foodstuffs to be served and dispensing means for dispensing a predetermined selection of beverages, means defining food and beverage storage and preparation means within said enclosure and extending alongside a side wall opposite from said common side wall along which said ingress and egress passageways are positioned and thus being so located as to be readily accessible to said food and beverage serving means for permitting attendants to prepare and supply food and beverage to said food and beverage serving means without inteference with patrons moving along said aisle, said food and beverage storage and preparation means including:

cooking means for cooking food and including deep frying cookers and burners, cooling means including a refrigerator for maintaining food to be prepared in a cooled condition, and sink means connected to a suitable source of water for the washing of the food attendants' hands and the washing of the food in the preparation for the cooking thereof, electrical lighting means positioned at predetermined locations within the wheeled walled enclosure for illuminating the interior of said wheeled walled enclosure; and air circulating means carried by said enclosure above said cooking means and arranged to deliver fresh air from outside the enclosure to within the enclosure and to exhaust foul air and fumes from the area of food preparation.

3. A mobile kitchen and cafeteria unit accounting to claim 1 or 2 including means associated with said ingress and egress means for inhibiting flies and insects from entering said enclosure.

4. A mobile kitchen and cafeteria unit according to claim 3 wherein said means for inhibiting flies and insects from entering said enclosure comprises fans mounted above said ingress and egress means and positioned to direct a vertical column of air downwardly across said ingress and egress passageways.

5. A mobile kitchen and cafeteria unit according to 1 or 2 including awning means recessed within upper portions of a side wall of said mobile unit above said ingress and egress means, said awning means normally being in a retracted stored recessed position and adapted to be extended from the stored position to overlie and protect patrons moving into and out of said mobile unit.

6. A mobile kitchen and cafeteria unit according to claim 5 including moveable flaps overlying said recessed awning means with said flap normally being flush with the side wall of the mobile unit when the awning is in the stored nonuse position.

7. A mobile kitchen and cafteria unit according to 1 or 2 wherein said air circulating means includes a plurality of exhaust fans recessed in roof positions of said wheeled walled enclosure, and wherein moveable flaps overlie said bank of fans and normally shields said fans from the elements, said flaps being moveable from a closed position flush with the outer surface of the roof to an open position to expose said bank of fans when it is desired to place the fans in operation.

8. A mobile kitchen and cafeteria unit according to claim 2 including a container of fuel for the burners, a container of water for the sink and a container of wastewater for the sink within the wheeled walled enclosure, all of said containers carried in under portions of said wheeled walled enclosure.

9. A mobile kitchen and cafeteria unit according to claim 2 wherein said refrigerator means comprises an electrical walk-in refrigerator and further including generator means carried by said wheeled walled enclosure for supplying electrical power to said refrigerator and said lights.

* * * * *